R. R. BARNES.
AUTOMOBILE DRIVEN STEERING WHEEL.
APPLICATION FILED NOV. 27, 1917.
1,284,984. Patented Nov. 19, 1918.
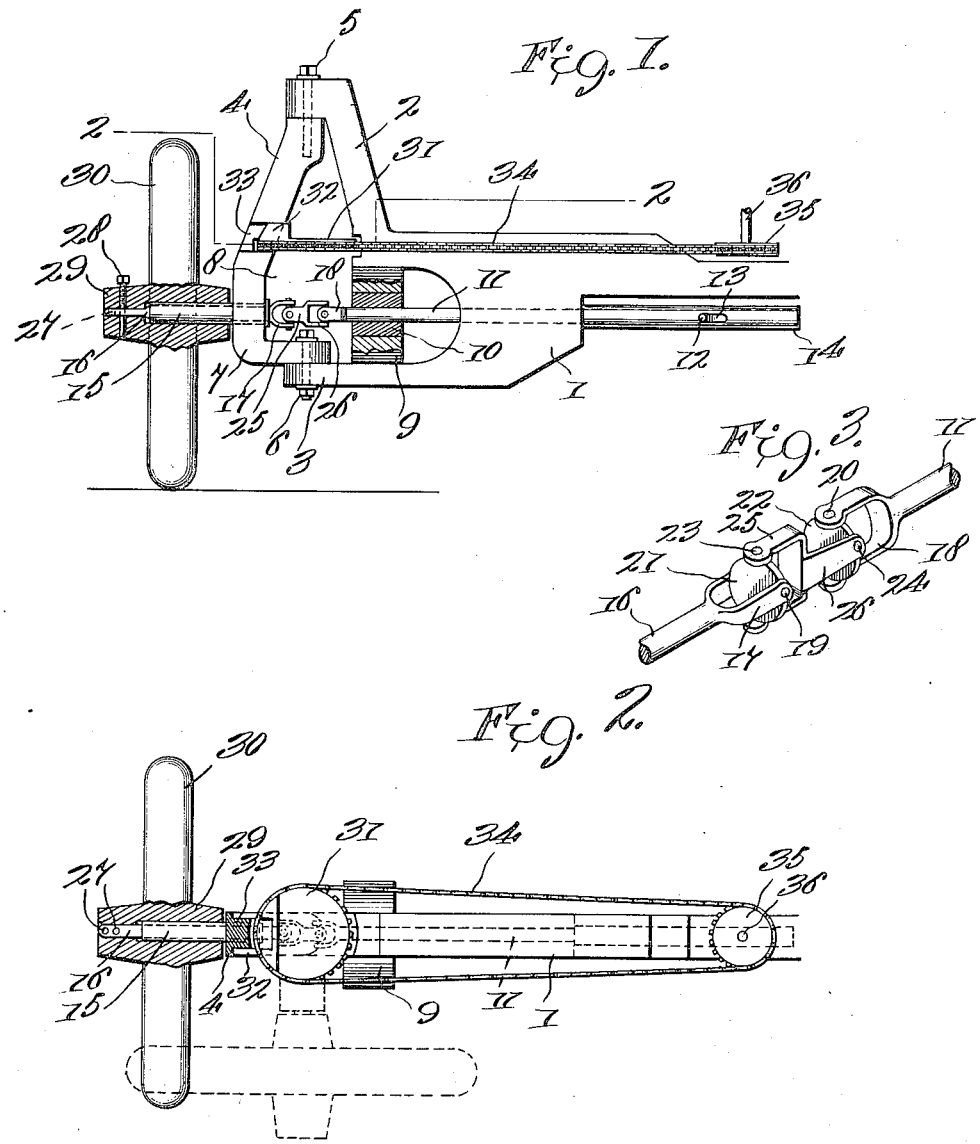

UNITED STATES PATENT OFFICE.

RICHARD RODOLPHUS BARNES, OF BLANCHARD, LOUISIANA.

AUTOMOBILE DRIVEN STEERING-WHEEL.

1,284,984.  Specification of Letters Patent.  Patented Nov. 19, 1918.

Application filed November 27, 1917. Serial No. 204,218.

*To all whom it may concern:*

Be it known that I, RICHARD R. BARNES, a citizen of the United States, residing at Blanchard, in the parish of Caddo and State of Louisiana, have invented certain new and useful Improvements in Automobile Driven Steering-Wheels; and I do hereby declare the following to be a full, clear, and exact description of the invention, such as will enable others skilled in the art to which it appertains to make and use the same.

The present invention relates to improvements in automobile driven steering wheel, and has for its primary object to render it practicable to drive not only the rear wheels of an automobile but also the front wheels, and at the same time not interfere with the necessary steering operation of the latter.

It is another object of my invention that, by driving all four wheels of the vehicle at the same time the traction may be increased so as to make it possible for vehicles to be driven over soft ground and up steep inclines.

A further object of my present invention resides in providing for increased facility in moving the steering wheels, and in an increased movement of the steering wheels so as to make sharper turns possible.

In the accompanying drawings forming a part of this application, and in which similar reference symbols indicate corresponding parts in the several views:

Figure 1 is a fragmentary elevational view of a vehicle front axle showing my invention as applied thereto, with parts illustrated in section.

Fig. 2 is a top plan view thereof, also with parts shown in section; and

Fig. 3 is a fragmentary view of the drive and stub shafts and the universal coupling therebetween.

Referring more particularly to the drawings, the front vehicle axle is indicated at 1, and carries the usual forks 2 and 3 in which the steering knuckle 4 is mounted on pivots 5 and 6. The steering knuckle 4 is formed with an unusually enlarged offset 7 for providing a space 8 between said steering knuckle and the adjacent end of the front axle 1 to receive the universal joint, whereby the drive and stub shafts are connected together as hereinafter more fully explained.

Between the forks 2 and 3 is supported a bearing 9, which receives a journal block 10 fitted to the drive shaft 11. This drive shaft 11 is rotatably journaled in the axle 1 and also is capable of an axial or longitudinal movement therethrough.

A pin 12 on the drive shaft 11 projects through an elongated slot 13 in a sleeve 14; which sleeve is adapted to be associated with a differential and to be driven through a transmission similar to the manner in which the rear wheels of vehicles are at the present time propelled. The pin and slot connection, 12, 13, renders it possible for the drive shaft 11 to slide axially in the front axle 1, while at the same time said shaft is continuously rotated to drive the front wheels of the vehicle.

The steering knuckle 4 at the offset 7 thereof, carries a sleeve 15 extending coincident with the drive shaft 11 and receiving therethrough a stub shaft 16, the inner end of which is formed into a yoke 17 lying within the space 8 and substantially in alinement with the pivots 5 and 6.

Opposite the yoke 17 on the stub shaft 16, is a similar yoke 18 formed on the outer end of the drive shaft 11. Each of these yokes 17 and 18 are perforated to receive pins 19 and 20 on disks 21 and 22, respectively. These disks 21 and 22 are also supplied with other pairs of pins 23 and 24, disposed diametrically opposite each other and arranged at substantially right angles to the first-mentioned pins 19 and 20.

A double yoke 25, 26, is placed between the drive shaft 11 and stub shaft 16, and has its perforated arms engaged with the pairs of pins 23 and 24; all in the manner best illustrated in Fig. 3.

This construction forms an exceedingly flexible universal joint for imparting to the stub shaft 16 a continuous rotary motion, while at the same time allowing the steering knuckle 4 to be freely turned in either direction to guide the vehicle.

The stub shaft 16 projects outwardly beyond the sleeve 15, where it is formed with a series of perforations 27 adapted to be entered by the point of a set screw 28 threaded through the hub 29 of the front steering wheel 30. The series of perforations 27 admit of adjustment as hereinafter referred to.

A sprocket 31 is attached by a clamp 32 to a reduced portion 33 of the steering kunckle 4 and is turned by a chain 34 operated by a second sprocket 35 from a shaft 36. This last mentioned shaft 36 is connected up by suitable mechanism to the steering post.

In the use of the invention, power is applied to drive the sleeve 14 which, through the walls of the slot 13 engaging with the sides of the pin 12, transmits a like rotary motion to the drive shaft 11. This motion is communicated to the stub shaft 16 through the universal joint and through the set screw 28 to the ground steering wheel 30. This driven motion of the wheel 30 is not interfered with by the steering operation which is imposed on the wheel 30 through the chain and sprocket mechanism above described.

Through the double universal joint and enlarged offset 7 of the knuckle 4, the wheel 30 is made capable of swinging through a very wide arc, as shown in dotted lines in Fig. 2, and it is accordingly possible to negotiate exceedingly sharp turns with my device. In turning, the drive shaft 11 will have a slight longitudinal play in the axle 1, which will facilitate the movement of the parts of the universal joint. Should it be desired to use but a single universal joint, the double yoke 25, 26, and one of the disks may be removed, so that the yoke 17 on the stub shaft 16 may be directly connected, for instance, with the pins 24 of the disk 22 carried in the yoke 18 of the drive shaft 11. For this purpose it becomes necessary to shift the stub shaft 16 axially through the sleeve 15, and, to permit such, the set screw 28 is removed from engagement with the perforated end of said stub shaft until after adjustment, when said set screw is returned to engage the perforation which at that time registers with the threaded opening in the hub 29 through which said set screw passes.

It is obvious that those skilled in the art may vary the details of construction and arrangements of parts without departing from the spirit of my invention, and therefore I do not wish to be limited to such features except as may be required by the claims.

I claim:

1. A device of the character described including a vehicle front axle, steering forks carried by said axle, a steering knuckle journaled to swing in said forks, a drive shaft journaled to rotate and move axially in said axle, a stub shaft journaled in said steering knuckle, a wheel mounted on said stub shaft, a double universal joint arranged between said drive shaft and stub shaft, one member of said universal joint being adapted to be removed so as to allow the parts to be coupled together to provide a single universal joint, means for fixing said wheel to rotate with said stub shaft, said stub shaft carrying spaced means engaged by said last named means when either the double or the single universal joint is used, and means for swinging said knuckle to steer the vehicle, substantially as described.

2. In a device of the character described, the combination of a vehicle front axle, forks on said axle, a steering knuckle journaled to swing in said forks, a drive shaft rotating and moving axially in said axle, a stub shaft journaled in said steering knuckle and adapted to be moved axially therethrough, a sleeve also carried by said steering knuckle, a wheel mounted on said sleeve, the hub of said wheel extending about the outer projecting end of said stub shaft, said outer projecting end of said stub shaft having spaced perforations therein, a screw passing through the hub of said wheel and having its end adapted to engage in either of said perforations, a double universal joint arranged between said drive and stub shafts and having a part thereof removable whereby the joint may be converted into a single universal joint, and means for swinging said steering knuckle to steer the vehicle, substantially as described.

In testimony whereof, I affix my signature.

RICHARD RODOLPHUS BARNES.